Dec. 10, 1940.  E. FILSINGER  2,224,674
CAMERA FLASHLIGHT SYNCHRONIZER
Filed Dec. 8, 1938
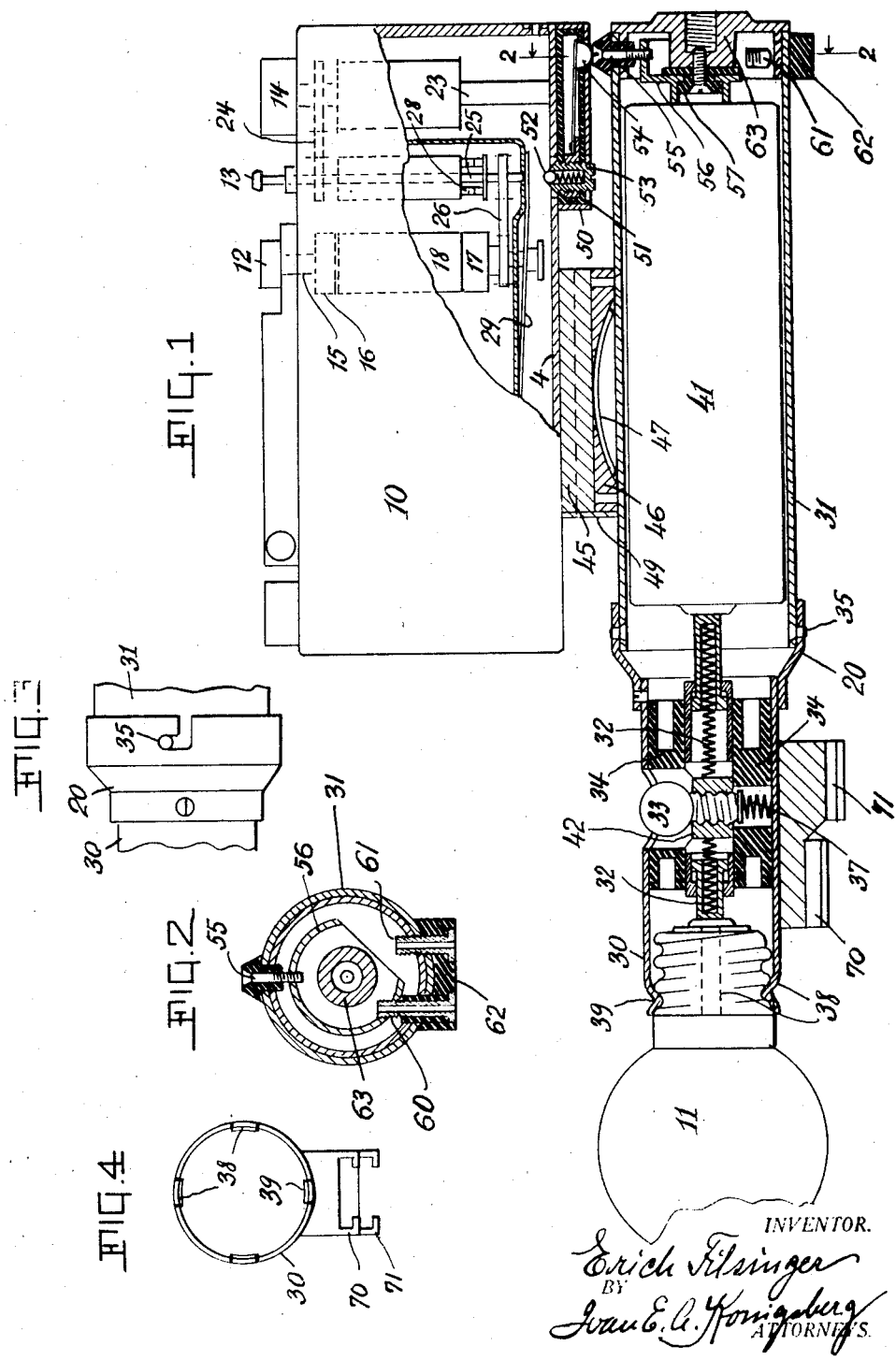
INVENTOR.
Erich Filsinger
BY
Ivan E. A. Konigsberg
ATTORNEYS Patented Dec. 10, 1940

2,224,674

UNITED STATES PATENT OFFICE 2,224,674

CAMERA FLASHLIGHT SYNCHRONIZER

Erich Filsinger, Wetzlar, Germany, assignor, by mesne assignments, to Frank Dumur, Lausanne, Switzerland Application December 8, 1938, Serial No. 244,567
In Germany August 9, 1938

2 Claims. (Cl. 67—29)

This invention relates to improvements in camera flashlight synchronizers of the type in which a flashlight unit is detachably mounted on the camera and the circuit closed through operation of the shutter release as the most readily available instrumentality.

More particularly this invention relates to a flashlight synchronizer adapted for use with the miniature hand camera known as the Leica camera.

Inasmuch as it is old in the art to detachably secure flashlight synchronizers to the bottom, the side or the top of a camera, and in view of the fact that it has been proposed to close the circuit through the flashlight by operation of the shutter release, these particular features in their broad aspects form no part of this invention which is directed to certain novel features of construction, use and operation whereby a more efficient flashlight synchronizer for cameras may be provided. One particular feature of the invention is embodied in an adjustable switch contact whereby the timing of the flash with relation to the opening of the shutter may be accurately determined and controlled, it being obvious that for perfect exposures it is desirable that the setting off of the flash be made adjustable and controllable depending upon the nature of the object.

Accordingly this invention is embodied in a camera flashlight synchronizer arranged and constructed as hereinafter set forth and as illustrated in the accompanying drawing in which Fig. 1 is a full size view of a flashlight synchronizer embodying the invention attached to a Leica camera, with parts in section and parts broken away.

Fig. 2 is a sectional detail view on the line 2—2 of Fig. 1.

Fig. 3 illustrates a bayonet joint for quickly separating parts of the synchronizer and for correctly placing reflectors with relation to the lamp.

Fig. 4 is a detail view of the reflector supports.

The camera 10 is shown as being of the well known Leica type of a miniature or hand film camera to which the photoflash 11 is to be attached. Only so much of the camera mechanism is shown as is necessary to understand the invention. The numeral 12 indicates the shutter setting knob, 13 the shutter release and 14 the shutter rewinding and film advancing knob. The camera is provided with a focal plane shutter of well known two-curtains design, not shown, except that the main curtain shaft 15 is indicated together with the reels 16 and 17 and the drum 18 to which the shutter curtains are attached.

After an exposure the shutter is rewound by rotating the knob 14 on the film roller shaft 23 and whereby through trains of gears 24, the shutter release shaft 25 and another train of gears 26 the shutter members 16, 17 and 18 are rotated to rewind the shutter and whereby the film is advanced a picture length. When an exposure is to be made, the release shaft 25 is depressed by the operator to uncouple a clutch 28 whereby to disconnect the rewinding mechanism from the shutter. The release is momentary and the clutch 28 automatically couples the aforesaid rewinding members so that the shutter may be rewound. The moving in of the clutch 28 is accomplished by a spring 29 which serves to lift the release shaft 25 after it has been depressed. All the foregoing merely describes a typical standard mechanism which is well known in the art.

The photoflash comprises a photoflash bulb 11 which is detachably held in a bulb tube 30 which in turn is suitably secured to a dry battery casing 31, the conducting connections from the bulb being on the one side through springs 32 to the battery 41 and grounded on the other side to the tube 30 and the casing 31 as usual. A pilot lamp 33 may be contained in the bulb tube 30, suitable insulation 34 being provided. The bulb tube may be secured to the battery casing by a coupling nipple 20 and bayonet joint 35. The pilot lamp is connected by its socket 42 to one side with the springs 32 to the battery 41 and the photoflash bulb 11. To the other side the pilot lamp is grounded on the tube 30 by a spring 37.

It is important that the photoflash bulb be replaced as quickly as possible, hence it is not screwed in and out like an ordinary electric bulb, but the tube 30 is cut as shown in Fig. 4 to provide four resilient fingers 38 each of which is crimped as at 39 to snap inward and engage the threads of the bulb. In operation the bulb is simply pushed into and pulled out of the tube 30 without screwing.

The photoflash is detachably secured to the camera by the following means. To the bottom of the camera bottom 4 there is secured a channeled block 45 formed with a channel such as shown at 70 and 71 in Figs. 1 and 4. To the battery casing 31 there is secured a slide or piece 46 adapted to slide lengthwise into and engage the channel in the block 45 against a stop 49 thereon. The piece 46 contains a bow spring 47 which engages the bottom of the channel in the block 45 to provide frictional engagement between the block 45 and the slide 46. Thus the photoflash is securely and detachably mounted on the camera.

The electrical connection between the camera and the flashlight is made as follows. To the camera bottom there is secured a switch unit in the form of a small casing 50 which is lined with insulation 51. The casing supports a switch contact in the form of a spring seated ball 52 within a socket 53. The latter is screwed into the casing as shown and the ball 52 may therefore be moved inward or outward with respect to the shutter release shaft 25. A spring contact 54 is supported in conducting relation with the ball. The contact extends outside the casing 50. When the flashlight unit is attached to the camera, a screw contact 55 in the unit engages the spring contact 54. The screw 55 is screwed into a conducting bushing 56 which contacts the battery casing 41. Insulation as at 57 is provided so that the path of the current will be from the battery 41 direct to the screw contact 55.

The operation is as follows: Before making an exposure the operator may test his contacts by depressing the release shaft 25 before the flash bulb 11 is attached. By depressing the release contacts are made as follows: From the battery 41 to screw contact 55, contact 54, ball contact 52 and to depressed camera spring 29 which is and to ground. To the other side from the battery to spring 32, to lamp 33, to spring 37, to battery casing 31, to camera casing which is ground. When he finds that the pilot lamp lights up, the operator inserts the flash bulb 11. Now when an exposure is made by depressing the release 13, the circuit is closed at 29—52 and the flash bulb explodes.

Not only may the operator test the circuit but he may also adjust the timing of the flash by means of the pilot lamp. Inasmuch as there is a time lag before the flash reaches its peak of illuminating power it is necessary that some means be provided whereby the timing of the flash with respect to the shutter opening may be controlled. In the present instance this may conveniently be done by adjusting the contact ball socket 53. By screwing this socket inward an earlier closing of the circuit is assured and vice versa. The adjustment is accomplished very easily and can be accurately gauged by means of the pilot lamp. The operator depresses the shutter release and then observes the lighting up of the pilot lamp with respect to the shutter opening or closing.

Means are also provided for attaching an extension flash lamp cord to the synchronizer unit. To the end of the battery casing there are secured two extension cord sockets 60 and 61, Fig. 2. The one socket 60 is secured to the conducting bushing 56. The other socket 61 is secured to the battery casing, the parts being properly insulated by insulation as at 62. A bottom cover 63 encloses the parts and provides a finished appearance.

When an extension cord is plugged into the sockets 60 and 61 the current passes as described above and also from the bushing 56 to the socket 60, then through the extension and back to the battery by way of the other socket 61 as will be understood.

The bayonet joint connection at 35 serves two purposes. First it connects the lamp unit to the battery casing. Second it places the unit always in the same position so that the flanges 70 and 71 in the lamp unit which serves to receive suitable reflectors are always placed so that the reflectors are in the same position with respect to the lamp and the camera and the light will be reflected towards the object. Fig. 1 shows the back of the camera and the reflectors are slid into the flanges behind the lamp as will be understood. An extension cord is not shown as it is no part of the invention. No reflectors are shown because reflectors for synchronizers are known.

The synchronizer herein disclosed is characterized by a very compact and efficient construction. It is easily attached to the camera with lamp to one side so as not to interfere with the taking of pictures. It requires but very little change in the camera construction. In actual practice the camera may be equipped permanently with a bottom which supports the channel 45 and the switch housing 50, or a separate bottom may be used. Accurate regulation of the timing of the flash is provided for and the reflector supports are always placed in the same position. It will further be observed that the circuit is always open except at the moment when the shutter release is moved so far down that the spring 29 engages the ball contact when taking snapshots.

I claim:—

1. In combination with a camera having a shutter mechanism including a hand operated movable element to release the shutter, a switch housing on the camera, a spring seated ball contact in said housing projecting into the camera to be engaged by said movable element, a second spring seated contact connected to said ball contact and projecting outside said switch housing, a flashlight unit including a battery and means for securing a flashlight bulb to said unit, cooperating means on said camera and said flashlight unit for detachably securing the unit to the camera, a fixed contact on said unit adapted to engage said second contact when the unit is attached to the camera, said battery in said unit having one side connected to said fixed contact and the other side connected to the said hand operated movable element by means of said flashlight bulb and said cooperating securing means and means accessible from outside said switch housing for adjusting the said ball contact to vary the timing of the closing of the circuit through the same.

2. In combination with a camera having a shutter mechanism including a hand operated movable element to release the shutter, a switch housing on the camera, a spring seated ball contact in said housing projecting into the camera to be engaged by said movable element, a second spring seated contact connected to said ball contact and projecting outside said switch housing, a flashlight unit including a battery and means for securing a flashlight bulb to said unit, cooperating means on said camera and said flashlight unit for detachably securing the unit to the camera, a fixed contact on said unit adapted to engage said second contact when the unit is attached to the camera, a battery in said unit having one side connected to said fixed contact and the other side connected to the said hand operated movable element by means of said flashlight bulb and said cooperating securing means, a pilot lamp in said unit connected in series with the said battery and movable element and means for adjusting the said ball contact to regulate the closing of the circuit through the said pilot lamp with respect to the release of the shutter.

ERICH FILSINGER.